(12) United States Patent
Sawayanagi et al.

(10) Patent No.: US 8,489,771 B2
(45) Date of Patent: Jul. 16, 2013

(54) ADDRESS BOOK TRANSMISSION PROGRAM, ADDRESS BOOK TRANSMISSION METHOD, AND ADDRESS SERVER

(75) Inventors: Kazumi Sawayanagi, Itami (JP); Toshihiko Otake, Ikeda (JP); Hideyuki Matsuda, Suita (JP); Okihisa Yoshida, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 976 days.

(21) Appl. No.: 12/342,323

(22) Filed: Dec. 23, 2008

(65) Prior Publication Data
US 2009/0201539 A1 Aug. 13, 2009

(30) Foreign Application Priority Data
Feb. 13, 2008 (JP) .................................. 2008-032334

(51) Int. Cl.
*G06F 3/12* (2006.01)
(52) U.S. Cl.
USPC ............... 709/246; 358/1.15; 709/248; 710/8
(58) Field of Classification Search
USPC ........................ 358/1.15; 709/246, 248; 710/8
See application file for complete search history.

(56) References Cited

U.S. PATENT DOCUMENTS

| | | | |
|---|---|---|---|
| 6,956,942 B2* | 10/2005 | McKinzie et al. | 379/355.04 |
| 2002/0046296 A1* | 4/2002 | Kloba et al. | 709/248 |
| 2007/0081399 A1 | 4/2007 | Kishimoto | |
| 2007/0121651 A1* | 5/2007 | Casey et al. | 370/401 |

FOREIGN PATENT DOCUMENTS

| | | |
|---|---|---|
| JP | 2002-314706 | 10/2002 |
| JP | 2003-108479 A | 4/2003 |
| JP | 2003-244308 A | 8/2003 |

(Continued)

OTHER PUBLICATIONS

Notification of Reasons for Refusal issued in corresponding Japanese Application No. 2008-032334 dated Dec. 22, 2009, and an English Translation thereof.

*Primary Examiner* — David Moore
*Assistant Examiner* — Peter K Huntsinger
(74) *Attorney, Agent, or Firm* — Buchanan Ingersoll & Rooney PC

(57) ABSTRACT

The present invention provides a computer-readable recording medium having recorded therein an address book transmission program for causing a computer, which includes a storage that stores therein one or more pieces of address book data, to transmit the pieces of address book data to a data transmission apparatus, each of the pieces of address book data corresponding to one or more senders, the address book transmission program causing the computer to execute: a receiving step of receiving, from the data transmission apparatus, apparatus information indicating a state of the data transmission apparatus; a reading step of reading a piece of address book data that corresponds to a sender out of the pieces of address book data stored in the storage; a judging step of, based on the apparatus information received in the receiving step, specifying a use mode that shows how the data transmission apparatus uses address book data, and judging whether or not the piece of address book data read in the reading step is appropriate to the specified use mode; an editing step of, if a result of the judging step is negative, editing the read piece of address book data so as to be appropriate to the specified use mode; and a transmitting step of transmitting the edited piece of address book data to the data transmission apparatus.

11 Claims, 11 Drawing Sheets

FOREIGN PATENT DOCUMENTS

| | | |
|---|---|---|
| JP | 2005-033733 A | 2/2005 |
| JP | 2006-020049 A | 1/2006 |
| JP | 2006-080730 A | 3/2006 |
| JP | 2007-081578 A | 3/2007 |

* cited by examiner

| VERSION | RECIPIENT SETTING ADDRESS BOOK |
|---|---|
| Ver. 01.01 | NG |
| Ver. 01.02 | OK |
| Ver. 01.03 | OK |
| Ver. 02.01 | OK |

FIG.7A

| | | |
|---|---|---|
| 田中 | | |
| 鈴木 | 受信者設定に従う | |
| 吉田 | 受信者設定に従う | |
| 太田 | ohta@xxxx.xx | |
| 山本 | 072-XXXX-XXXX | |

- A3T (outer frame)
- A3e — 田中
- A3a — 鈴木
- A3b — 受信者設定に従う
- A3c — 吉田
- A3d — 受信者設定に従う
- A3f — 太田
- A3g — 山本

FIG.7B

| | |
|---|---|
| 田中 | |
| 鈴木 | http://xxx.xxx/WebDAV |
| 吉田 | 072-YYYY-YYYY |
| 太田 | ohta@xxxx.xx |
| 山本 | 072-XXXX-XXXX |

- A4T
- A4a — 鈴木
- A4b — http://xxx.xxx/WebDAV
- A4c — 吉田
- A4d — 072-YYYY-YYYY

FIG.7C

| | |
|---|---|
| TANAKA | |
| SUZUKI | FOLLOW RECIPIENT'S SETTING |
| YOSHIDA | FOLLOW RECIPIENT'S SETTING |
| OHTA | ohta@xxxx.xx |
| YAMAMOTO | 072-XXXX-XXXX |

- A5T
- A5e — TANAKA
- A5a — SUZUKI
- A5b — FOLLOW RECIPIENT'S SETTING
- A5c — YOSHIDA
- A5d — FOLLOW RECIPIENT'S SETTING
- A5f — OHTA
- A5g — YAMAMOTO

FIG.9

| VERSION | SUPPORTED DATA FORMAT | SUPPORTED MAXIMUM RESOLUTION | COLOR SUPPORT |
|---|---|---|---|
| Ver. 01.01 | JPEG, GIF | 20 * 20 | NG |
| Ver. 01.02 | JPEG, JPEG2000, GIF | 25 * 25 | NG |
| Ver. 01.03 | JPEG, JPEG2000, GIF | 25 * 25 | NG |
| Ver. 02.01 | JPEG, JPEG2000 | 30 * 30 | OK |

T2

ADDRESS BOOK TRANSMISSION PROGRAM, ADDRESS BOOK TRANSMISSION METHOD, AND ADDRESS SERVER

CROSS-REFERENCE TO RELATED APPLICATION

This application is based on application No. 2008-032334 filed in Japan, the contents of which are hereby incorporated by reference.

BACKGROUND OF INVENTION (1) Field of the Invention

The present invention relates to an address server that manages an address book used by data transmission apparatuses for transmitting data on a data transmission/reception system, and an address book transmission program used by the address server.

(2) Related Art

Recently, a data transmission technique has been used in a data transmission/reception system composed of a plurality of data transmission apparatuses that are connected for transmitting/receiving data to/from one another. Each of the data transmission apparatuses is for example an MFP (Multi-Function Peripheral) having transmission functions such as a FAX function, an electronic mail transmission function, an FTP (File Transfer Protocol) function, and an SMB (Server Message Block) function. According to this technique, an address server centrally manages an address book in which lists of recipients' addresses are registered beforehand such that any of the data transmission apparatuses included in the data transmission/reception system can refer to the recipients' addresses. The data transmission apparatuses perform data transmission using the address book by downloading it from the address server. Such a technique is disclosed in Japanese Patent Application Publication No. 2003-108479, Japanese Patent Application Publication No. 2003-244308, Japanese Patent Application Publication No. 2005-33733, and Japanese Patent Application Publication No. 2006-20049, for example.

By the way, in order to further improve the convenience of the above data transmission/reception system, the applicant of the present invention suggests a mechanism in which it is possible to refer to receiving addresses respectively registered by users themselves, using the address book. According to this mechanism, each of the users registers a receiving address as an address for receiving data destined to the user in the address server, separately from the address book in which the recipients' addresses are registered. By correlating the address book with the receiving address, it is possible to refer to the receiving address using the address book. When a sender of data logs into the address server, a data transmission apparatus firstly acquires the address book from the address server. When the sender transmits the data to a recipient who has registered his receiving address in the address server for receiving data destined to the recipient, the data transmission apparatus accesses the address server to acquire the latest receiving address of the recipient. The above mechanism is useful in that the recipient can have the sender transmit data to the recipient's preferred and latest receiving address, and the sender does not need to update his address book even when the receiving address of the recipient has been changed.

However, when both conventional and new data transmission apparatuses are connected in the data transmission/reception system, some of the conventional data transmission apparatuses do not support the above new mechanism in which the address book and a receiving address are related with each other. As a result, such conventional data transmission apparatuses cannot appropriately perform data transmission by referring to the receiving address.

Also, there is a technique in which an image such as a face photograph is stored in correspondence with a recipient's name in the address book, and the image is displayed together with the corresponding recipient's name. When the address book includes recipients having the same name, it is possible for a sender to correctly designate an intended recipient by checking a face photograph of the intended recipient.

However, when both conventional and new data transmission apparatuses are connected in the data transmission/reception system, there is a case where the address book includes an image compressed in a new image compression format (for example, JPEG-2000 format). In such a case, some of the conventional data transmission apparatuses do not support this new image compression format, and as a result cannot display the image in the new image compression format included in the address book.

As described above, a problem might occur that when an address book stored in the address server is inappropriate to a use mode in which a data transmission apparatus uses the address book due to the capability of the data transmission apparatus, the data transmission apparatus cannot not properly use the address book, and as a result, cannot determine a recipient's address.

Furthermore, recent data transmission apparatuses support a plurality of types of languages, and display descriptions on its screen in a language that has been determined for each of the data transmission apparatuses (hereinafter referred to as a "determined language").

However, there is a case that a description language of an address book stored in the address server is different from a determined language of a data transmission apparatus. In such a case, even when this data transmission apparatus acquires the address book and displays the acquired address book, a user of the data transmission apparatus might not be able to understand items included in the displayed address book such as a recipient's name.

As described above, a problem also might occur that when an address book stored in the address server is inappropriate to a use mode in which a data transmission apparatus uses the address book due to the configuration of the data transmission apparatus, the data transmission apparatus cannot not appropriately use the address book, and as a result, cannot determine a recipient's address.

The present invention is made in view of the above problems. In a system in which, a data transmission apparatus receives an address book stored in an address server and uses the received address book, the present invention aims to make it possible for the data transmission apparatus to determine a recipient's address, even when the address book stored in the address server is inappropriate to a use mode in which the data transmission apparatus uses the address book due to a problem of the capability or the configuration of the data transmission apparatus.

SUMMARY OF THE INVENTION

In order to achieve the above problem, an aspect of the present invention provides a computer-readable recording medium having recorded therein an address book transmission program for causing a computer, which includes a storage that stores therein one or more pieces of address book data, to transmit the pieces of address book data to a data transmission apparatus, each of the pieces of address book data corresponding to one or more senders, the address book transmission program causing the computer to execute: a receiving step of receiving, from the data transmission apparatus, apparatus information indicating a state of the data transmission apparatus; a reading step of reading a piece of address book data that corresponds to a sender out of the pieces of address book data stored in the storage; a judging step of, based on the apparatus information received in the receiving step, specifying a use mode that shows how the data transmission apparatus uses address book data, and judging whether or not the piece of address book data read in the reading step is appropriate to the specified use mode; an editing step of, if a result of the judging step is negative, editing the read piece of address book data so as to be appropriate to the specified use mode; and a transmitting step of transmitting the edited piece of address book data to the data transmission apparatus.

Also, in order to achieve the above problem, another aspect of the present invention provides an address book transmission method for causing a computer, which includes a storage that stores therein one or more pieces of address book data, to transmit the pieces of address book data to a data transmission apparatus, each of the pieces of address book data corresponding to one or more senders, the address book transmission method comprising: a receiving step of receiving, from the data transmission apparatus, apparatus information indicating a state of the data transmission apparatus; a reading step of reading a piece of address book data that corresponds to a sender out of the pieces of address book data stored in the storage; a judging step of, based on the apparatus information received in the receiving step, specifying a use mode that shows how the data transmission apparatus uses address book data, and judging whether or not the piece of address book data read in the reading step is appropriate to the specified use mode; an editing step of, if a result of the judging step is negative, editing the read piece of address book data so as to be appropriate to the specified use mode; and a transmitting step of transmitting the edited piece of address book data to the data transmission apparatus.

Furthermore, in order to achieve the above problem, another aspect of the present invention provides an address server that transmits pieces of address book data to a data transmission apparatus, the address server comprising: a storage that stores therein one or more pieces of address book data, each of the pieces of address book data corresponding to one or more senders; a receiver operable to receive, from the data transmission apparatus, apparatus information indicating a state of the data transmission apparatus; a reader operable to read a piece of address book data that corresponds to a sender out of the pieces of address book data stored in the storage; a judge operable to, based on the apparatus information received by the receiver, specify a use mode that shows how the data transmission apparatus uses address book data, and judge whether or not the piece of address book data read by the reader is appropriate to the specified use mode; an editor operable to, if a result of the judgment by the judge is negative, edit the read piece of address book data so as to be appropriate to the specified use mode; and a transmitter operable to transmit the edited piece of address book data to the data transmission apparatus.

With the above structure, by causing a computer to execute the address book transmission program of the present invention, the computer functions as an address server, specifies a use mode in which a data transmission apparatus uses an address book. When the address book stored in the computer is inappropriate to the use mode, the computer edits the address book so as to be appropriate to the use mode, and transmits the edited address book to the data transmission apparatus. Accordingly, even when an address book stored in the computer is inappropriate to a use mode in which a data transmission apparatus uses the address book due to a problem of the capability or the configuration of the data transmission apparatus, the data transmission apparatus can determine a recipient's address using the address book.

Also, in the address book transmission program, the storage further stores therein receiving addresses respectively corresponding to recipients' names, each of the pieces of address book data includes, with respect to each of the recipients' names, one of a receiving address and a reference instruction for referring to a receiving address corresponding to the recipient's name among the receiving addresses stored in the storage, if the read piece of address book data includes at least one reference instruction with respect to at least one of the recipients' names, the judging step judges, based on the apparatus information, whether or not the use mode shows that the data transmission apparatus receives a receiving address corresponding to the at least one of the recipients' names stored in the storage to use the corresponding receiving address, and the editing step edits the piece of address book data to extract the corresponding receiving address from the storage and replace the reference instruction with the corresponding receiving address.

With this structure, when a data transmission apparatus is not capable of using a function for receiving a receiving address registered by a recipient stored in the computer to designate the received receiving address as an address of the recipient, the computer edits an address book by inserting the receiving address into the address book, and transmits the edited address book to the data transmission apparatus. Accordingly, the data transmission apparatus can refer to the inserted receiving address by acquiring data of the address book. Therefore, even when an address book is inappropriate to a use mode in which a data transmission apparatus uses the address book, the data transmission apparatus can determine a recipient's address using the address book.

Also, in the above address book transmission program, the read piece of address book data includes an item described in a prescribed language, the apparatus information indicates a determined language that has been determined for the data transmission apparatus, the judging step judges, based on the apparatus information, whether or not the use mode shows that the data transmission apparatus uses the prescribed language as the determined language, and the editing step edits the piece of address book data to convert the item described in the prescribed language into the item described in a common language.

With this structure, when a determined language of a data transmission apparatus is different from a description language of an address book stored in the computer, the computer edits the address book to convert a description of the address book stored in the computer into a common language description, and transmits the edited address book to the data transmission apparatus. The common language is a language whose description can be generally understood by most of users, and is for example English. Fonts of the common language are stored in data transmission apparatuses specified by each of countries, as a standard specification. Accordingly, for example, there is a possibility that when items of an address book are described in Japanese and a determined language of a data transmission apparatus is a language other than Japanese, even if the data transmission apparatus receives data of this address book, a user of the data transmission apparatus might not be able to understand the items described in Japanese. In such a case, since the Japanese description is converted into a description in a common language, the user can understand the description of the items and perform operations for selecting a recipient's name. Therefore, even when an address book is inappropriate to a use mode in which a data transmission apparatus uses the address book, the data transmission apparatus can determine a recipient' address using the address book.

Also, in the above address book transmission program, the read piece of address book data includes image data in a prescribed data format, the judging step specifies, based on the apparatus information, as the use mode, one or more data formats according to which the data transmission apparatus is able to display the image data when displaying the piece of address book data, and judges whether or not the use mode shows that the data transmission apparatus is able to display image data in the prescribed data format, by judging whether or not the prescribed data format is included in the specified data formats, and the editing step edits the piece of address book data to convert the prescribed data format of the image data into one of the specified data formats.

With this structure, when a data transmission apparatus does not support a data format of image data included in an address book stored in the computer, the computer edits the address book to convert the data format of the image data into a data format according to which the data transmission apparatus can display the image, and transmits the edited address book to the data transmission apparatus. Accordingly, since the data transmission apparatus can display the image included in the received address book, a user of the data transmission apparatus can select a recipient by checking the displayed image. Therefore, even when an address book is inappropriate to a use mode in which a data transmission apparatus uses the address book, the data transmission apparatus can determine a recipient's address using the address book.

Also, in the above address book transmission program, the read piece of address book data includes image data having a prescribed resolution, the judging step specifies, based on the apparatus information, as the use mode, one or more resolutions according to which the data transmission apparatus is able to display the image data when displaying the piece of address book data, and judges whether or not the use mode shows that the data transmission apparatus is able to display image data having the prescribed resolution, by judging whether or not the prescribed resolution is included in the specified resolutions, and the editing step edits the piece of address book data to convert the prescribed resolution of the image data into one of the specified resolutions.

With this structure, when a data transmission apparatus does not support a resolution of an image included in an address book stored in the computer, the computer edits the address book to convert the resolution of the image into a resolution according to which the data transmission apparatus can display the image, and transmits the edited address book to the data transmission apparatus. Accordingly, since the data transmission apparatus can display the image included in the received address book, a user of the data transmission apparatus can select a recipient by checking the displayed image. Therefore, even when an address book is inappropriate to a use mode in which a data transmission apparatus uses the address book, the data transmission apparatus can determine a recipient's address using the address book.

Also, in the above address book transmission program, the read piece of address book data includes, with respect to each of recipients' names, one of a piece of monochrome image data and a piece of color image data, if the piece of address book data includes at least one piece of color image data with respect to at least one of the recipients' names, the judging step judges, based on the apparatus information, whether or not the use mode shows that the data transmission apparatus is able to display color image data, and the editing step edits the piece of address book data to convert the color image data into monochrome image data.

With this structure, when a data transmission apparatus is not capable of displaying color image and an address book stored in the computer includes color image data, the computer edits the address book to convert the color image data into monochrome image data, and transmits the edited address book to the data transmission apparatus. Accordingly, since the data transmission apparatus can display, as a monochrome image, the color image included in the received address book data, a user of the data transmission apparatus can select a recipient by checking the displayed monochrome image. Therefore, even when an address book is inappropriate to a use mode in which a data transmission apparatus uses the address book, the data transmission apparatus can determine a recipient's address using the address book.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 7 shows examples of personal address books displayed by the MFP 200 according to the first embodiment;

FIG. 9 shows a version information table T2 according to the second embodiment;

DETAILED DESCRIPTION OF PREFERRED EMBODIMENTS

The following describes embodiments of the present invention with reference to the drawings.

First Embodiment (1. Structure)
(1-1. System Structure)

Figure 1:
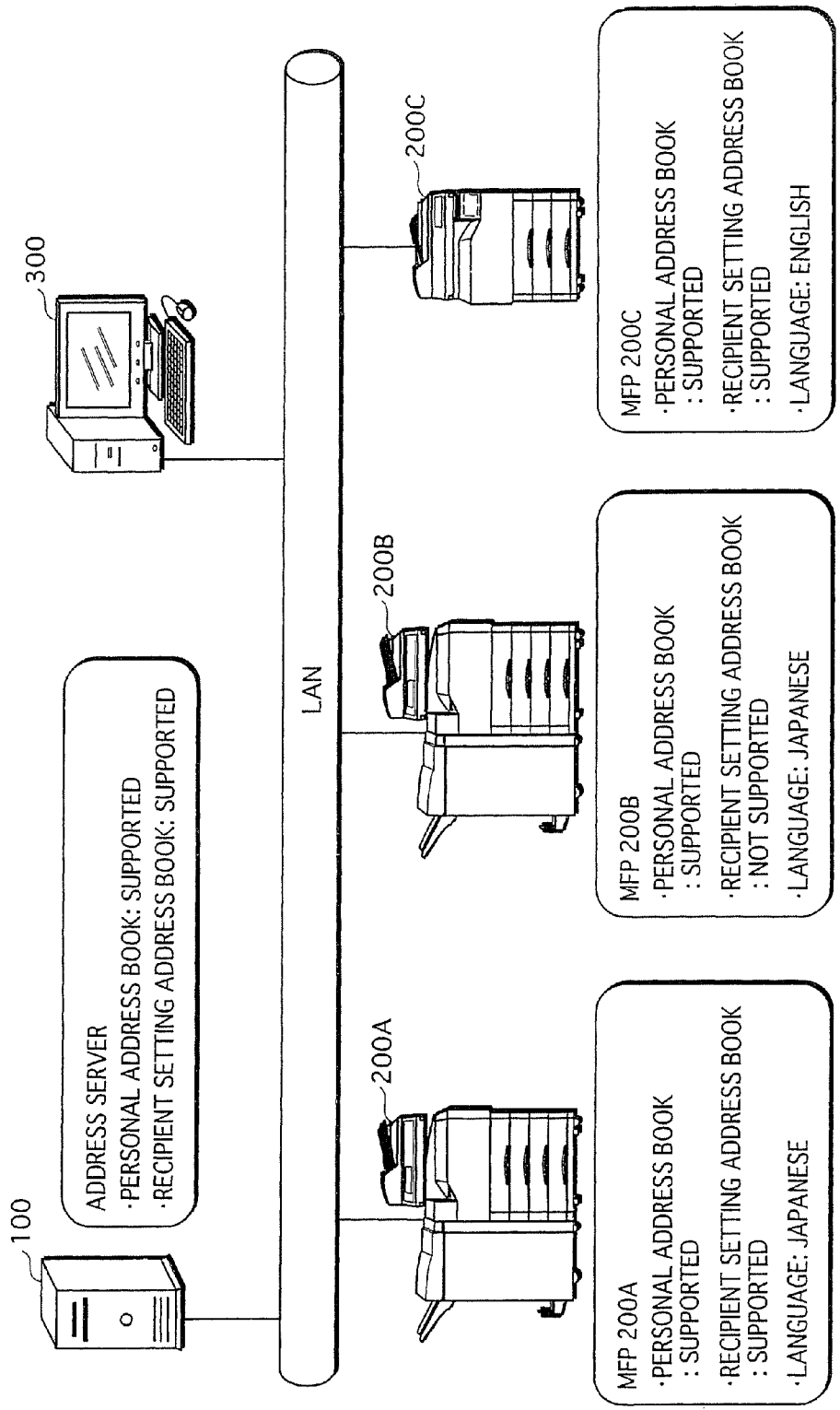
FIG. 1 shows a data transmission system that includes an address server 100, an MFP 200, and a PC 300.

FIG. 1 shows a data transmission system that includes an address server 100 according to a first embodiment, a plurality of MFPs 200A to 200C, and a PC (Personal Computer) 300 that are connected with each other via a LAN (Local Area Network).

Each of the MFPs 200A to 200C is an example of a data transmission apparatus. Although three MFPs are shown in FIG. 1 for convenience, the number of MFPs to be included in the data transmission system is not limited to three. When the MFPs 200A to 200C are not distinguished from each other, the MFPs 200A to 200C are collectively referred to as an MFP 200.

The address server 100 is a general-purpose computer such as a workstation computer, and functions as an address server by executing an address book transmission program which is described later. The address server 100 stores, in a storage device included therein, personal address book data and recipient setting address book data which are described later. A user creates personal address book data and recipient setting address book data using the PC 300, and stores the created personal address book data and recipient setting address book data in the address server 100. At least one of these address books is received and used by the MFP 200 for specifying an address of a recipient to which data is transmitted.

The MFP 200 has a function for transmitting image data using various transmission methods such as FAX and e-mails via the LAN and other wide area networks which are not shown in the figure. The image data is for example image data generated by scanning documents, image data stored therein, and image data transmitted by a sender from the PC 300. The MFP 200 includes both conventional MFPs and new MFPs, which often have different versions. Functions of the MFP 200 differ depending on version. For example, an MFP 200 with a new version has a function for specifying a recipient's address by receiving and using personal address book data and recipient setting address book data that are stored in the address server 100. On the other hand, an MFP 200 with a conventional version has a function for specifying a recipient's address by receiving and using personal address book data stored in the address server 100, and does not have a function for specifying a recipient's address by receiving and using recipient setting address book data stored in the address server 100. Also, it is possible to determine a language for displaying characters in the MFP 200. For example, it is possible to select English as a determined language for displaying characters. It is generally considered that most of users can understand English descriptions. Also, as a standard specification, English fonts are stored in MFPs specified by each of countries. In addition to English, it is possible to select Japanese as a determined language for displaying characters, for example. Here, in the example shown in FIG. 1, the MFP 200A has a version including a function for specifying a recipient's address by receiving and using personal address book data and recipient setting address book data that are stored in the address server 100, and a determined language of the MFP 200A is Japanese. The MFP 200B has a version including a function for specifying a recipient's address by receiving and using personal address book data stored in the address server 100, and does not have a function for specifying a recipient's address by receiving and using recipient setting address book data stored in the address server 100, and a determined language of the MFP 200B is Japanese. The MFP 200C has a version including a function for specifying a recipient's address by receiving and using a personal address book and a recipient setting address book data that are stored in the address server 100, and a determined language of the MFP 200C is English.

Note that when the MFP 200 performs communication with the address server 100, the MFP 200 transmits apparatus information showing a state thereof to the address server 100. The apparatus information includes version information showing a version of the MFP 200 and determined language information showing a language determined for the MFP 200. Accordingly, the address server 100 is notified of the version and the determined language of the MFP 200.

(1-2. Structure of Address Server 100)

Figure 2:
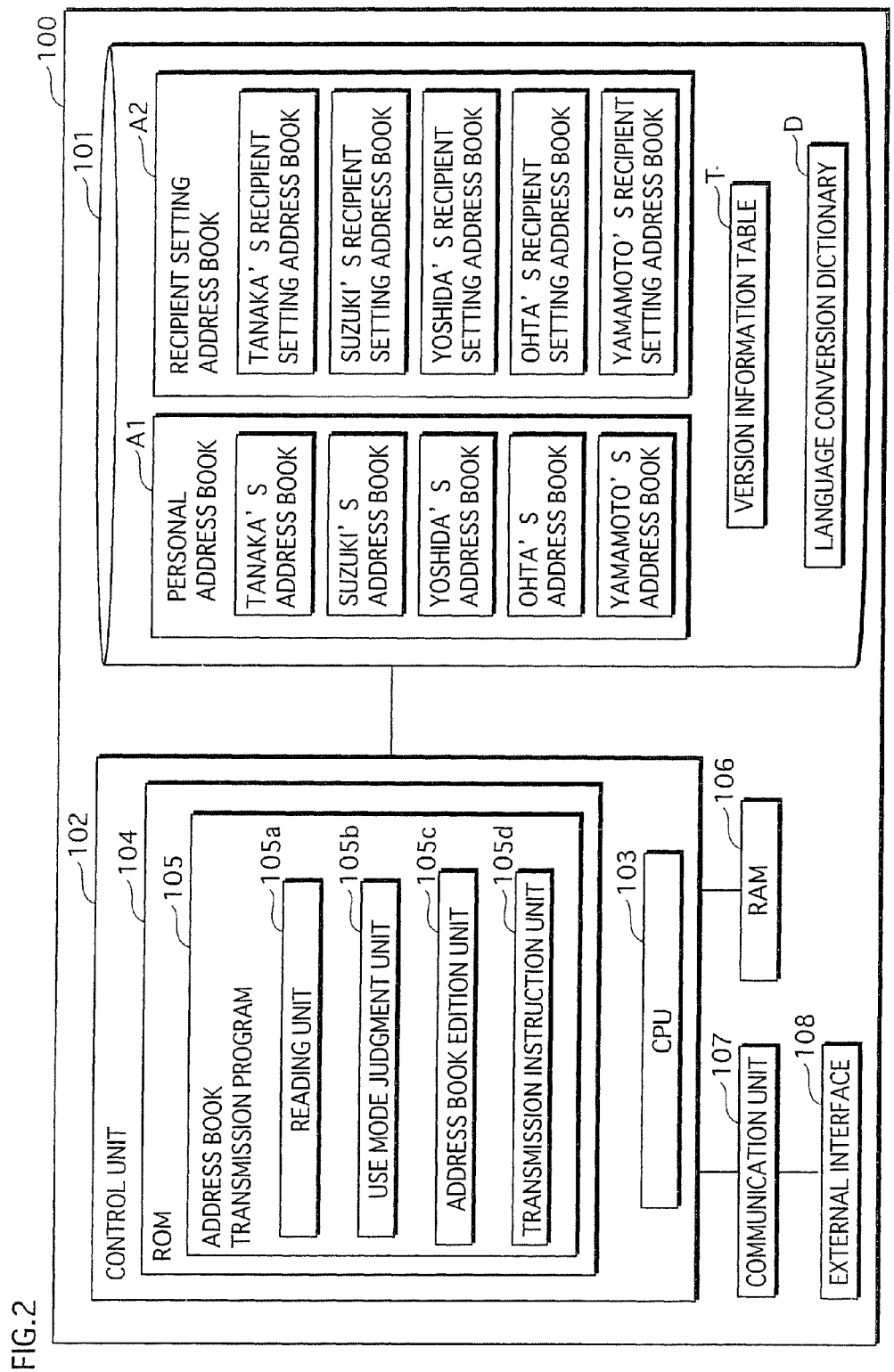
FIG. 2 is a block diagram showing the structure of the address server 100.

FIG. 2 is a block diagram showing the structure of the address server 100.

As shown in FIG. 2, the address server 100 includes a storage unit 101, a control unit 102, a RAM (Random Access Memory) 106, a communication unit 107, and an external interface 108.

The storage unit 101 is a storage medium such as a hard disk, and stores therein a personal address book A1, a recipient setting address book A2, a version information table T1, and a language conversion dictionary D.

The personal address book A1 includes personal address books in which recipients are registered by each of users. The personal address book A1 here includes, as an example, address books respectively registered by five users TANAKA, SUZUKI, YOSHIDA, OHTA, and YAMAMOTO.

The recipient setting address book A2 includes address books respectively registered by the users themselves, as recipient setting addresses for receiving data destined to the users. The recipient setting address book A2 here includes, as an example, recipient setting address books respectively registered by the five users TANAKA, SUZUKI, YOSHIDA, OHTA, and YAMAMOTO.

The version information table T1 shows functions supported by the MFP 200 for each version.

Note that the names of the above five users included in the personal address book A1 and the recipient setting address book A2 are Japanese people names, and are described in Japanese language.

The language conversion dictionary D is a dictionary for converting a particular language description of items included in a personal address book into another language description. In the first embodiment, the language conversion dictionary D is used as a dictionary for converting Japanese descriptions or the like into English descriptions (descriptions in Roman characters), for example.

The control unit 102 controls each operation of the address server 100, and includes a CPU (Central Processing Unit) 103 and a ROM (Read Only Memory) 104.

The CPU 103 performs processing by reading programs from the ROM 104 and executing the read programs.

The ROM 104 stores therein programs to be executed by the CPU 103, and particularly stores therein an address book transmission program 105.

The address book transmission program 105 is a control program to be executed in order for the address server 100 to transmit the personal address book A1 and the recipient setting address book A2 to the MFP 200. The address book transmission program 105 includes a reading unit 105a, a use mode judgment unit 105b, an address book edition unit 105c, and a transmission instruction unit 105d.

The read unit 105a reads the personal address book A1 from the storage unit 101 into the RAM 106.

The use mode judgment unit 105b specifies a function supported by the MFP 200 based on the version information received from the MFP 200 via the external interface 108 and the communication unit 107 and the version information table T1, and specifies a determined language of the MFP 200 based on the language setting information received from the MFP 200 likewise, and judges whether the specified function and determined language of the MFP 200 support the personal address book A1.

In a case where the use mode judgment unit 105*b* judges that one of the function and the determined language of the MFP 200 does not support the personal address book A1, the address book edition unit 105*c* edits the personal address book A1 read into the RAM 106 so as to be supported by the one of the function and the determined language of the MFP 200.

The instruction unit 105*d* instructs the communication unit 107 to transmit the personal address book A1 stored in the RAM 106 to the MFP 200.

The RAM 106 is a work memory that temporarily stores therein data while the CPU 103 executes a program stored in the ROM 104.

The communication unit 107 performs data processing for transmitting and receiving data via the external interface 108. Specifically, the communication unit 107 performs data processing based on the Ethernet or a TCP/IP protocol, and transmits, to the control unit 102, data received from the MFP 200 via, the external interface 108, and transmits, to the external interface 108, data transmitted from the control unit 102.

The external interface 108 is for example a LAN adapter, and is between the LAN and the address server 100.

(2. Address Book)

The following describes the personal address book A1 and the recipient setting address book A2 that are stored in the storage unit 101.

(2-1. Personal Address Book A1)

Figure 3:
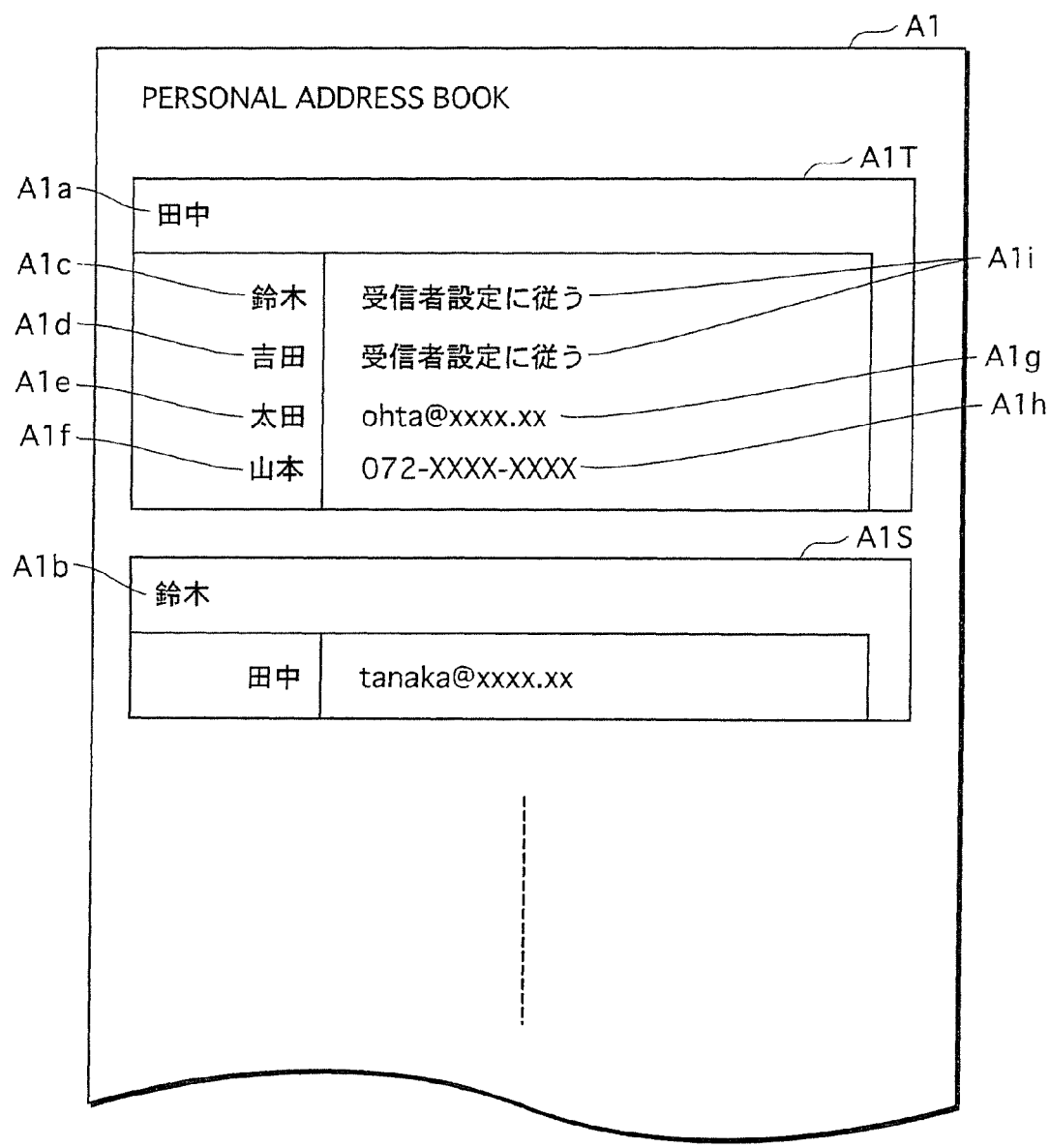
FIG. 3 shows a personal address book A1 according to a first embodiment.

FIG. 3 shows the personal address book A1, which is displayed in the MFP 200 for convenience.

As shown in FIG. 3, the personal address book A1 is composed of a plurality of address books in which recipients are registered by each of users. FIG. 3 selectively shows personal address books A1T and A1S respectively registered by TANAKA (A1*a* described in Japanese) and SUZUKI (A1*b* described in Japanese).

In the personal address book A1T of TANAKA (A1*a*), names of SUZUKI (A1*c* described in Japanese), YOSHIDA (A1*d* described in Japanese), OHTA (A1*e* described in Japanese), and YAMAMOTO (A1*f* described in Japanese) are registered as recipients. Also, in the personal address book of TANAKA (A1*a*), an e-mail address "ohta@xxxx.xx" (A1*g*) is registered as an address of OHTA (A1*e*), and a fax number "072-XXXX-XXXX" (A1*h*) is registered as an address of YAMAMOTO (A1*f*). With respect to addresses of SUZUKI (A1*c*) and YOSHIDA (A1*d*), flags are turned on that indicate that recipient setting addresses respectively registered in recipient setting address books by SUZUKI (A1*c*) and YOSHIDA (A1*d*) are used as addresses for receiving data destined from TANAKA. The MFP 200 displays a description "FOLLOW RECIPIENT'S SETTING" (A1*i* described in Japanese) on address fields corresponding to the flags. If the description "FOLLOW RECIPIENT'S SETTING" is displayed on an address field corresponding to a recipient, a recipient setting address registered by the recipient is used.

(2-2. Recipient Setting Address Book A2)

Figure 4:
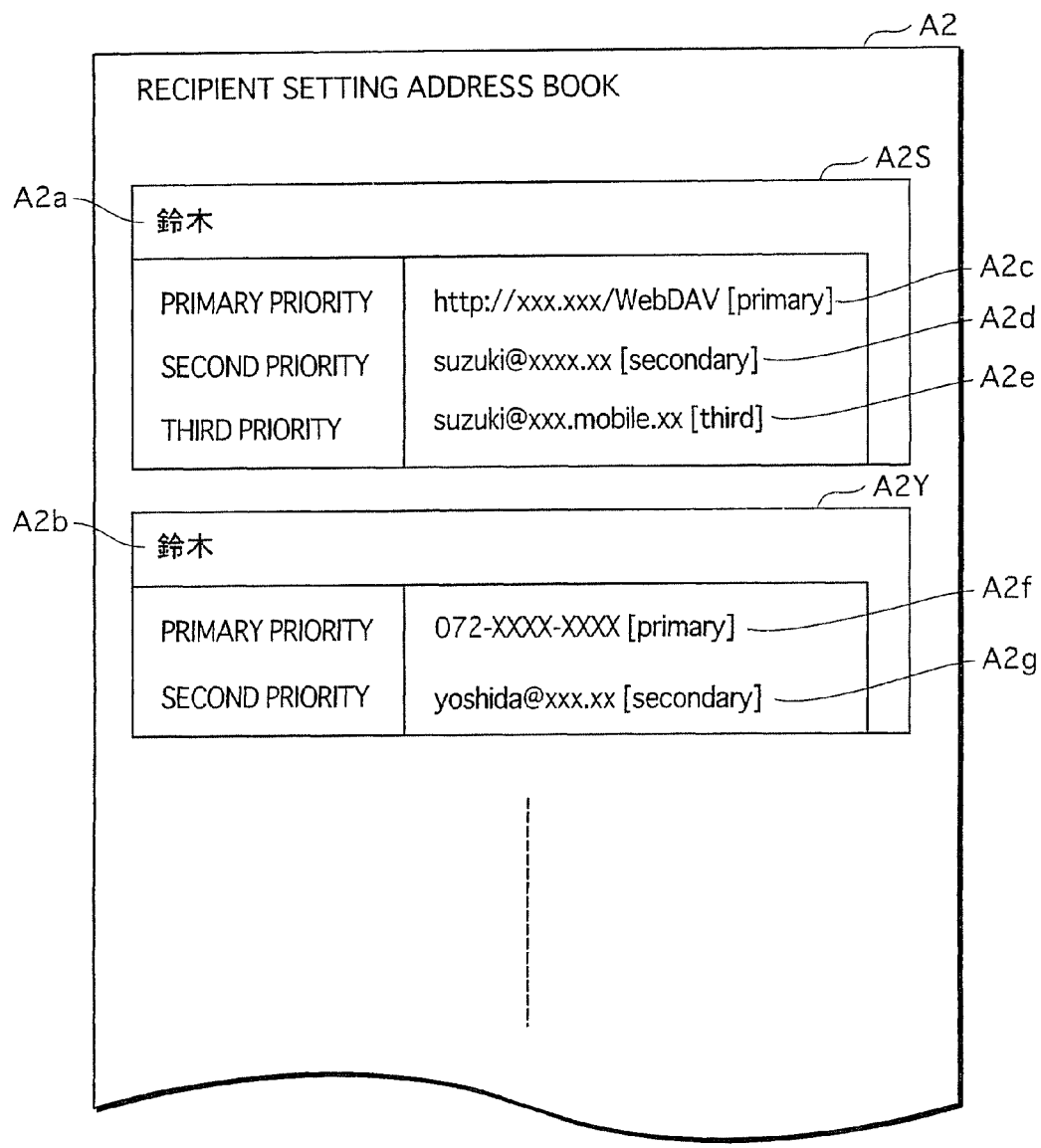
FIG. 4 shows a recipient setting address book A2.

FIG. 4 shows the recipient setting address book A2.

As shown in FIG. 4, the recipient setting address book A2 is composed of a plurality of address books respectively registered by the users themselves, as recipient setting addresses for receiving data destined to the users. FIG. 4 selectively shows recipient setting address books A2S and A2Y respectively registered by SUZUKI (A2*a* described in Japanese) and YOSHIDA (A2*b* described in Japanese).

In the recipient setting address book of SUZUKI (A2*a*), an address "http://xxx.xxx/WebDAV" (A2*c*) based on the Web-DAV (Web-based Distributed Authorizing and Versioning) standard is registered as a recipient setting address having a primary priority. Also, an e-mail address "suzuki@xxxx.xx" (A2*d*) is registered as a recipient setting address having a second priority. Furthermore, a mobile phone e-mail address "suzuki@xxxx.mobile.xx" (A2*e*) is registered as a recipient setting address having a third priority.

Also, in the recipient setting address book of YOSHIDA (A2*b*), a fax number "072-YYYY-YYYY" (A2*f*) is registered as a recipient setting address having a primary priority, and an e-mail address "yoshida@xxx.xx" (A2*g*) is registered as a recipient setting address having a second priority.

(2-3. How to Use Address Books)

Here, the following describes how to use the personal address book A1 and the recipient setting address book A2.

In order to transmit predetermined data, the MFP 200 connects to the address server 100, and receives personal address book data registered by a user from the address server 100. The MFP 200 designates addresses registered in the personal address book, and transmits the predetermined data to the designated addresses.

When the received personal address book includes a recipient whose address is described as "FOLLOW RECIPIENT'S SETTING" in an address field corresponding to the recipient, the MFP 200 again connects to the address server 100 immediately before transmitting the predetermined data, and receives, from the address server 100, a registered recipient setting address of the recipient whose address is described as "FOLLOW RECIPIENT'S SETTING" in the corresponding address field of the personal address book. The MFP 200 designates the received recipient setting address, and transmits the data to the designated recipient setting address.

Note that the MFP 200 that supports the recipient setting address books is capable of performing a first operation for designating a recipient's address included in a personal address book and a second operation for receiving the personal address book A1 and then receiving the recipient setting address book A2 to designate a recipient setting address included in the recipient setting address book A2. The MFP 200 that does not support the recipient setting address books is capable of performing the first operation, but is incapable of performing the second operation.

(3. Version Information Table)

Figure 5:
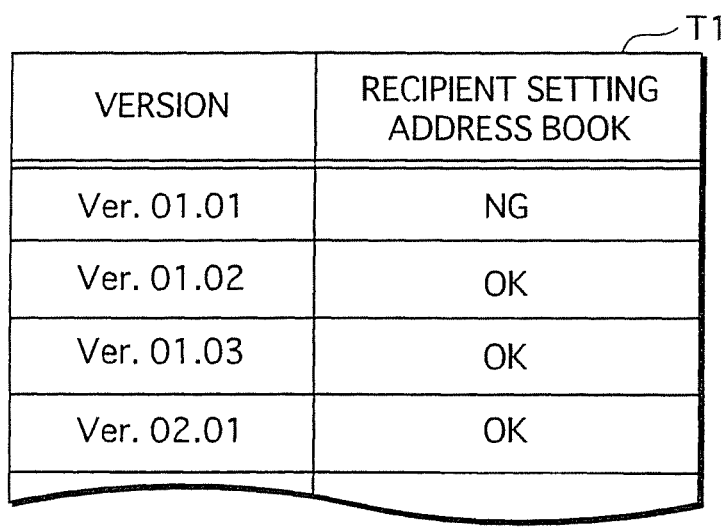
FIG. 5 shows aversion information table T1 according to the first embodiment.

FIG. 5 shows the version information table T1.

As shown in FIG. 5, the version information table T1 stores therein versions of the MFP 200 and flags each indicating whether the MFP 200 supports the recipient setting address book, in correspondence with each other. According to FIG. 5, the MFP 200 with Ver. 01.01 does not support the recipient setting address books. The MFPs 200 with Ver. 01.02, Ver. 01.03, and Ver. 02.01 support the recipient setting address books.

(4. Operations)

The following describes operations of the address server 100.

Figure 6:
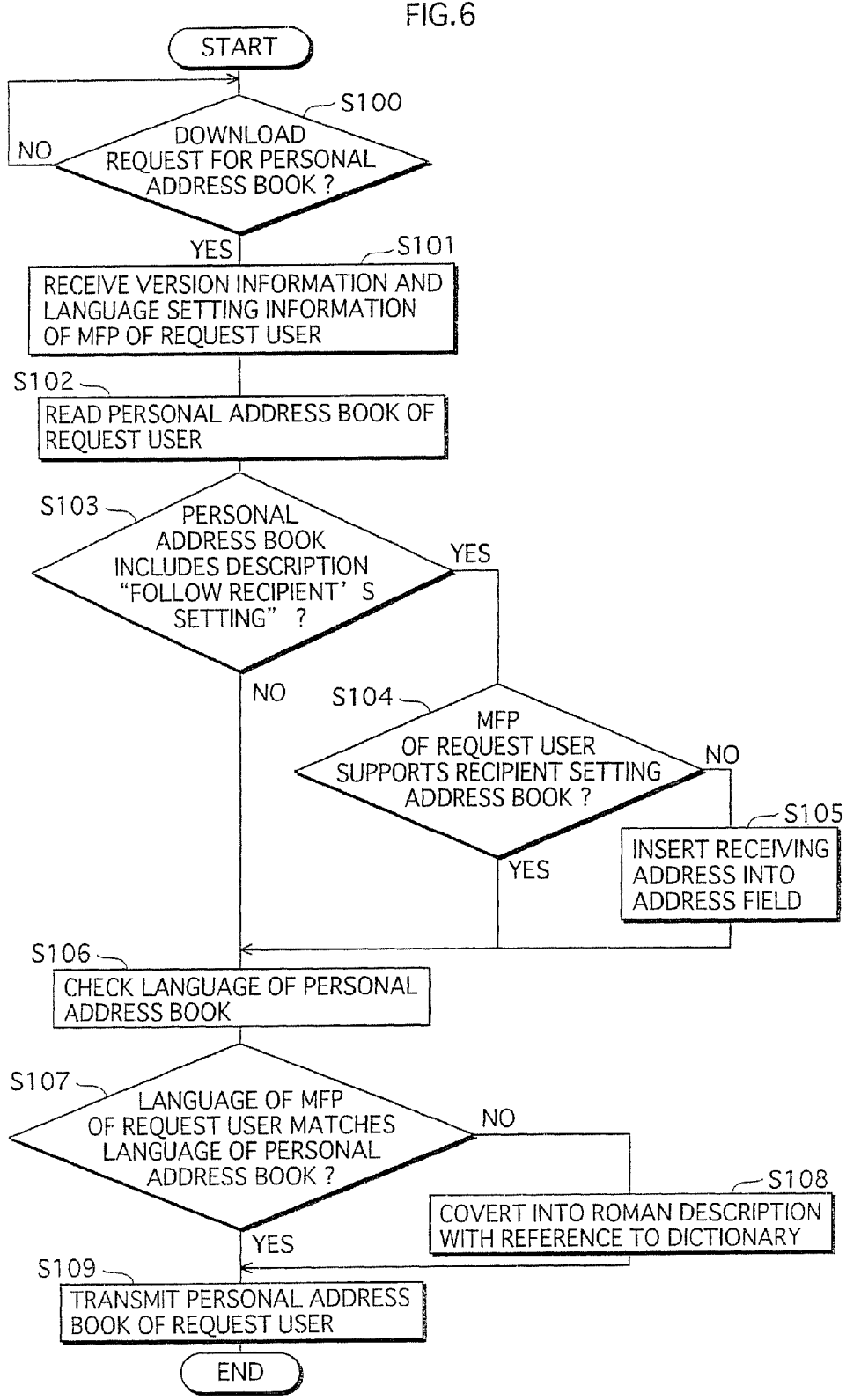
FIG. 6 is a flow chart showing operations of the address server 100 according to the first embodiment.

FIG. 6 is a flow chart showing the operations of the address server 100. FIG. 6 shows the operations performed when the address server 100 receives a download request for the personal address book A1 from the MFP 200.

As shown in FIG. 6, upon receiving a download request for a personal address book of a user (hereinafter referred to as a "request user") (Step S100: YES), the address server 100 receives apparatus information of the MFP 200 (Step S101). Note that the MFP 200 usually transmits version information and language setting information thereof in response to the download request for the personal address book.

The address server 100 reads data of a personal address book corresponding to the request user from the storage unit 101 into the RAM 106 (Step S102), and judges whether the personal address book includes a recipient whose address is described as "FOLLOW RECIPIENT'S SETTING" in an address field corresponding to the recipient (Step S103).

If the personal address book includes the recipient whose address is described as "FOLLOW RECIPIENT'S SETTING" (Step S103: YES), the address server 100 judges whether or not the MFP 200 supports the recipient setting address book A2 based on the version information of the MFP 200 received in Step S101 and the version information table T1 stored in the storage unit 101 (Step S104).

If the MFP 200 does not support the recipient setting address book A2 (Step S104: NO), the address server 100 reads, from the recipient setting address book A2, a recipient setting address registered by the recipient, and inserts the read recipient setting address into the corresponding address field of the personal address book stored in the RAM 106 (Step S105). As a result, the description "FOLLOW RECIPIENT'S SETTING" in the address field of the personal address book stored in the RAM 106 is edited to be the recipient setting address.

If the personal address book of the request user does not include the recipient whose address is described as "FOLLOW RECIPIENT'S SETTING" (Step S103: NO), or if the MFP 200 supports the recipient setting address book A2 (Step S104: YES), the address server 100 does not edit the personal address book.

Then, the address server 100 checks a description language of the personal address book of the request user (Step S106), and judges whether or not the description language of the personal address book of the request user is conformable to a determined language of the MFP 200, based on the language setting information received in Step S101 (Step S107).

If the description language of the personal, address book of the request user is unconformable to the determined language of the MFP 200 (Step S107: NO), the address server 100 converts the description of the recipients' names included in the personal address book stored in the RAM 106 into a description in Roman characters, with reference to the language conversion dictionary D (Step S108).

If the description language of the personal address book of the request user is conformable to the determined language of the MFP 200 (Step S107: YES), the address server 100 does not edit the personal address book.

Then, the address server 100 transmits the personal address book stored in the RAM 106 to the MFP 200 (Step S109). If the personal address book has not been edited in both Step S105 and Step S108, the personal address book to be transmitted to the MFP 200 in Step S109 is what has been read in Step S102 and not edited. If the personal address book has been edited in either of Step S105 and Step S108, the personal address book to be transmitted to the MFP 200 in Step S109 is what has been edited.

(5. Specific Example)

The following describes a specific example of a personal address book to be transmitted to the MFP 200 and displayed by the MFP 200 as a result of the operations shown in FIG. 6 performed by the address server 100.

FIGS. 7A to 7C show examples of personal address books displayed by the MFP 200. The examples here show cases where a request user of the MFP 200 is TANAKA.

FIG. 7A shows a personal address book A3T of TANAKA (A3a) to be transmitted in a case where edition has not been performed in both of Step S105 and Step S108. This personal address book A3T is the same as the personal address book A3T of TANAKA stored in the storage unit 101. This is because this personal address book has not been edited.

FIG. 7B shows a personal address book A4T to be transmitted in a case where edition has been performed in Step S105. In this personal address book A4T, the address of SUZUKI described as "FOLLOW RECIPIENT'S SETTING" in the personal address book A3T shown in FIG. 7A is edited to be the address "http://xxx.xxx/WebDAV" (A2c) registered in the recipient setting address book A2S shown in FIG. 4. Also, the address of YOSHIDA described as "FOLLOW RECIPIENT'S SETTING" in the personal address book A3T shown in FIG. 7A is edited to be the fax number "072-YYYY-YYYY" (A2f) registered in the recipient setting address book A2Y shown in FIG. 4.

FIG. 7C shows a personal address book to be transmitted in a case where edition has been performed in Step S108. This personal address book has been edited such that all descriptions in Japanese are converted into descriptions in Roman characters ("TANAKA" is converted from A3e to A5e, "SUZUKI" is converted from A3a to A5a, "YOSHIDA" is converted from A3c to A5c, "OHTA" is converted form A3f to A5f, and "YAMAMOTO" is converted from A3g to A5g). In this personal address book, the descriptions "FOLLOW RECIPIENT'S SETTING" are converted from Japanese (A3b and A3d) to English (A5b and A5d). This is because a determined language of the MFP 200 is English and the MFP 200 is configured to display descriptions in English based on a flag indicating that the MFP 200 supports the recipient setting address books.

(6. Conclusion)

As described above, when an MFP 200 does not support a function for determining a recipient's address using the recipient setting address book A2, a personal address book of a user of the MFP 200 is edited such that a recipient setting address registered by the recipient is inserted into an address field corresponding to the recipient in the personal address book. Then, the edited personal address book is transmitted to the MFP 200.

Also, when a determined language of an MFP 200 differs from a description language of a personal address book of a request user, the personal address book is edited to convert a description of items in a prescribed language into a description in a common language. Then, the edited personal address book is transmitted to the MFP 200.

Accordingly, even when an address book stored in the address server is inappropriate to a use mode in which a data transmission apparatus uses the address book due to a problem of the capability or the configuration of the data transmission apparatus, the data transmission apparatus can determine a recipient's address using the address book.

Second Embodiment

The following describes an address server 400 according to a second embodiment of the present invention.

In the first embodiment, the address server 100 edits the personal address book A1 depending on a determined language of an MFP 200 and whether the MFP 200 supports the recipient setting address book A2. In the second embodiment, when the personal address book A1 includes an image, the address server 400 edits the personal address book A1 depending on whether an MFP 200 supports the image.

The following describes the address server 400, focusing on the difference from the address server 100.

The structure of the address server 400 is substantially the same as the structure of the address server 100 as shown in FIG. 2. Data stored in a personal address book and a version information table stored in the storage unit 101 of the address server 400 are different from those of the address server 100.

(1. Personal Address Book A6)

Figure 8:
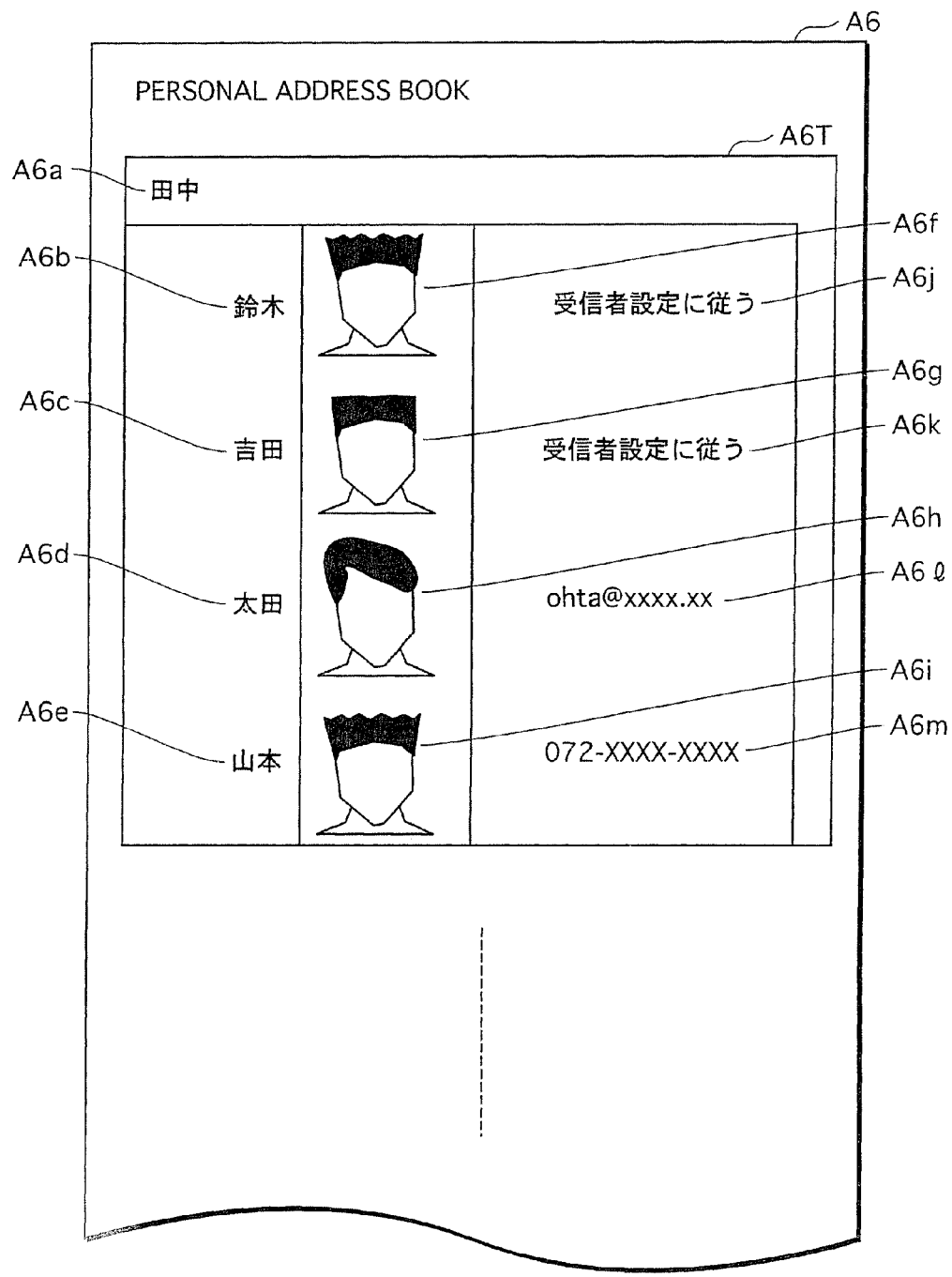
FIG. 8 shows a personal address book A6 according to a second embodiment.

FIG. 8 shows a personal address book A6 according to the second embodiment.

As shown in FIG. 8, the personal address book A6T according to the second embodiment is composed of a plurality of address books in which recipients and images corresponding thereto are registered each of users. FIG. 8 selectively shows a personal address book A6T registered by TANAKA (A6a described in Japanese).

In the personal address book of TANAKA (A6a), SUZUKI (A6b described in Japanese), YOSHIDA (A6c described in Japanese), OHTA (A6d described in Japanese), and YAMAMOTO (A6e described in Japanese) are registered as recipients. Also, images of face photographs (A6f to A6i) respectively corresponding to the recipients and addresses (A6j to A6m) of the recipients are registered. Furthermore, as addresses of OHTA (A6d) and YAMAMOTO (A6e), an e-mail address (A6l) and a fax number (A6m) are respectively registered. Also, flags are turned on that indicate that recipient setting addresses respectively registered in recipient setting address books by SUZUKI (A6b) and an address of YOSHIDA (A6c) are used as addresses for receiving data destined from TANAKA. The MFP 200 displays the description "FOLLOW RECIPIENT'S SETTING" (A6j and A6k described in Japanese) in address fields corresponding to the flags.

(2. Version Information Table T2)

FIG. 9 shows a version information table T2 according to the second embodiment.

As shown in FIG. 9, the version information table T2 according to the second embodiment stores therein versions of the MFP 200, a data format of image data supported (can be displayed) by the MFP 200, the maximum resolution supported (can be displayed) by the MFP 200, and a flag indicating whether color images are supported (can be displayed) by the MFP 200, in correspondence with each other.

According to FIG. 9, an MFP 200 with Ver. 01.01 supports monochrome image data having a maximum resolution of 20×20 in JPEG format and GIF format. An MFP 200 with Ver. 01.02 and an MFP 200 with Ver. 01.03 support monochrome image data having a maximum resolution of 25×25 in JPEG format, JPEG 2000 format, and GIF format. An MFP 200 with Ver. 02.01 supports monochrome and color image data having a maximum resolution of 30×30 in JPEG format and JPEG 2000 format.

(3. Operations)

The following describes operations of the address server 400.

Figure 10:
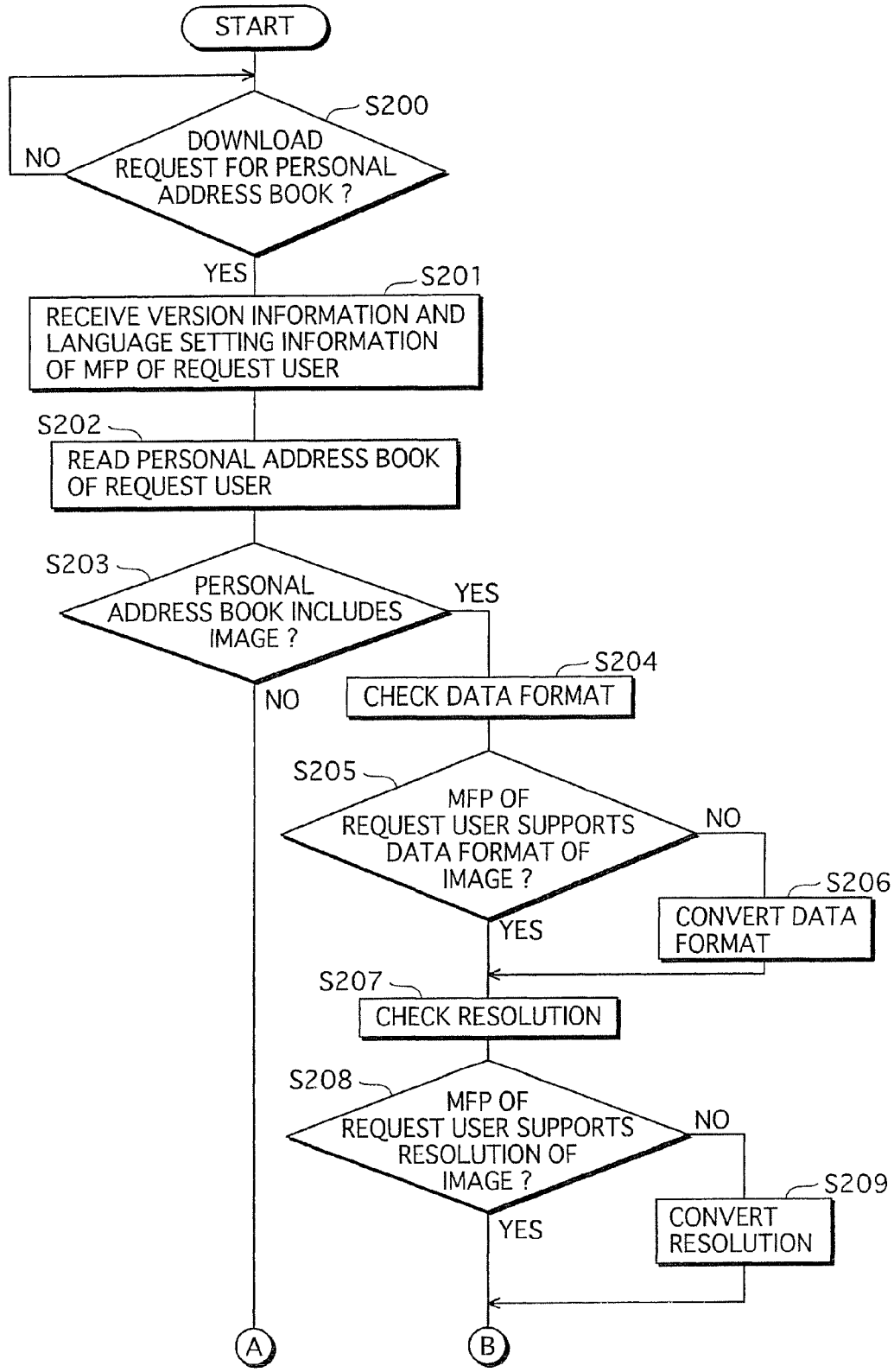
FIG. 10 is a first flow chart showing operations of an address server 400 according to the second embodiment.
Figure 11:
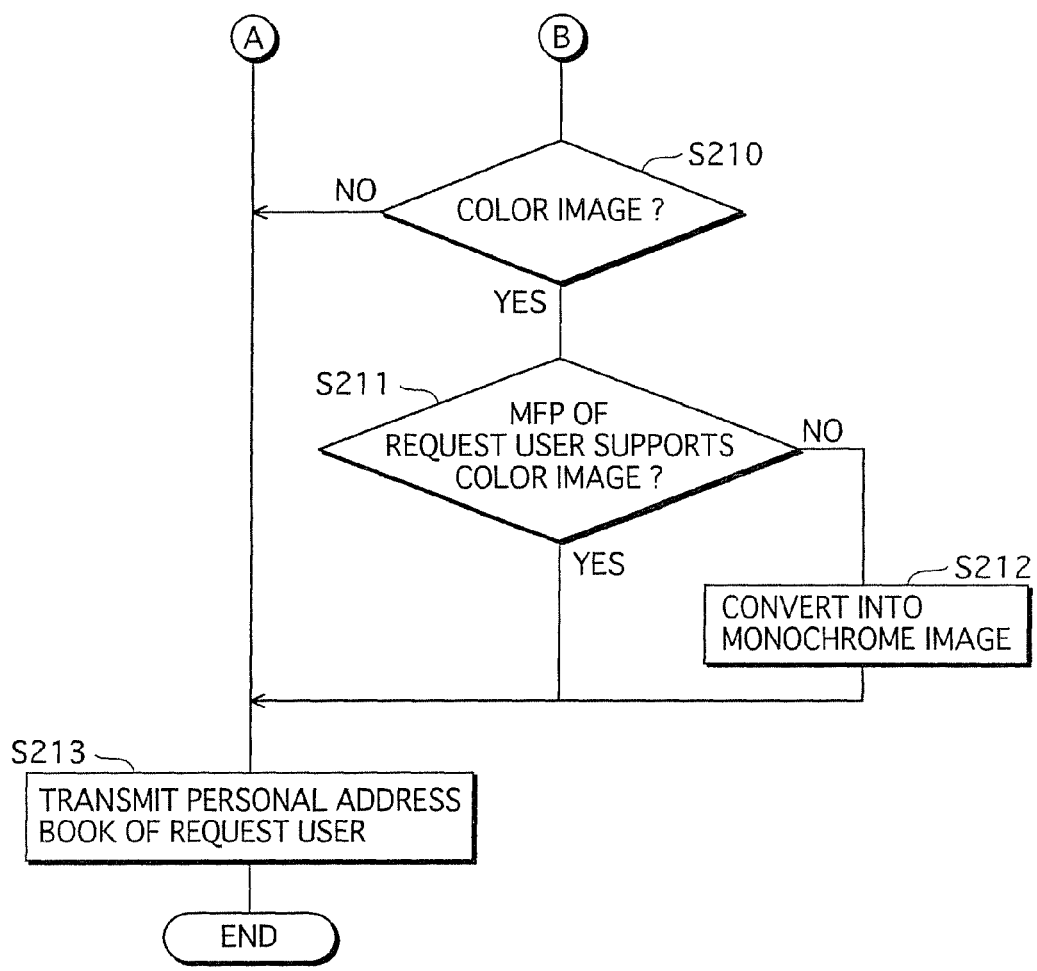
FIG. 11 is a second flow chart showing operations of the address server 400 according to the second embodiment.

FIGS. 10 and 11 are flow charts showing the operations of the address server 400. FIGS. 10 and 11 show the operations performed when the address server 400 receives a request for a personal address A6 book from the MFP 200.

As shown in FIGS. 10 and 11, upon receiving a download request for a personal address book of a request user (Step S200: YES), the address server 400 receives version information and language setting information of the MFP 200 (Step S201), and reads data of a personal address book corresponding to the request user from the storage unit 101 into the RAM 106 (Step S202). Processing performed in Steps S200 to S202 is the same as processing performed in Steps S100 to S102 shown in FIG. 6.

The address server 400 judges whether or not the personal address book stored in the RAM 106 includes an image (Step S203).

If the personal address book includes the image (Step S203: YES), the address server 400 checks a data format of the image (Step S204), and further judges whether or not the MFP 200 supports the data format of the image, based on the version information of the MFP 200 received in Step S201 and the version information table T2 (Step S205).

If the MFP 200 does not support the data format of the image (Step S205: NO), the address server 400 converts the data format of the image data included in the personal address book stored in the RAM 106 into a data format supported by the MFP 200 (Step S206). As a result, the format of the image included in the personal address book of the request user is edited to be a format according to which the MFP 200 can display the image.

If the MFP 200 of the request user supports the data format of the image (Step S205: YES), the address server 400 does not edit the personal address book.

Then, the address server 400 checks a resolution of the image (Step S207), and judges whether the MFP 200 supports the resolution of the image, based on the version information of the MFP 200 received in Step S201 and the version information T2 (Step S208).

If the MFP 200 does not support the resolution of the image (Step S208: NO), the address server 400 converts the resolution of the image included in the personal address book stored in the RAM 106 into a resolution supported by the MFP 200 (Step S209). As a result, the format of the image included in the personal address book of the request user is edited to be a format according to which the MFP 200 can display the image.

If the MFP 200 of the request user supports the resolution of the image (Step S208: YES), the address server 400 does not edit the personal address book.

Then, if the image is a color image (Step S210: YES) the address server 400 judges whether or not the MFP 200 supports color images, based on the version information of the MFP 200 received in Step S201 and the version information T2 (Step S211).

If the MFP 200 does not support color images (Step S211: NO), the address server 400 converts the color image included in the personal address book stored in the RAM 106 into a monochrome image (Step S212). As a result, the format of the image included in the personal address book of the request user is edited to be a format according to which the MFP 200 can display the image.

If the image included in the personal address book of the request user is a monochrome image (Step S210: NO), or if the MFP 200 of the request user supports color images (Step S211: YES), the address server 400 does not edit the personal address book.

Also, if the personal address book of the request user does not include an image (Step S203: NO), the address server 400 does not edit the personal address book.

Then, the address server 400 transmits the personal address book stored in the RAM 106 to the MFP 200 (Step S213). If the personal address book has not been edited in any of Steps S206, S209, and S212, the personal address book to be transmitted to the MFP 200 in Step S213 is what has been read in Step S202 and has not been edited. If the personal address book has been edited in either of Steps S206, S209, and S212, the personal address book to be transmitted to the MFP 200 in Step S213 is what has been edited.

(4. Conclusion)

As described above, when an MFP 200 does not support a data format or a resolution of an image included in the personal address book A6, the personal address book is edited to convert the data format or the resolution of the image into a data format or a resolution supported by the MFP 200. Then, the edited personal address book is transmitted to the MFP 200.

Also, if an image included in the personal address book A6 is a color image and an MFP 200 is capable of displaying only monochrome images, the personal address book is edited to convert the color image into a monochrome image, and then transmits the edited personal address book is transmitted to the MFP 200. Accordingly, since the data transmission apparatus can display the image included in the received address book, a user of the data transmission apparatus can select a recipient by checking the displayed image. Therefore, even when an address book is inappropriate to a use mode in which a data transmission apparatus uses the address book, the data transmission apparatus can determine a recipient's address using the address book.

<Supplementary Description>

While the data transmission apparatus of the present invention has been described based on the first and second embodiments, it is possible to add various modifications to the structures shown in the embodiments.

(1) In the first and second embodiments, the data transmission apparatus according to the present invention has been described by taking an example of an MFP. However, the data transmission apparatus is not limited to the MFP. The present invention is applicable to apparatuses having a function for transmitting any type of data such as images, sounds, and texts.

(2) In the first and second embodiments, the examples of the address server 100 have been shown in which the users (TANAKA, SUZUKI, YOSHIDA, OHTA, and YAMAMOTO) are in one-to-one correspondence with the personal address books. However, without limiting to this, a single personal address book may correspond to a plurality of users.

(3) The address book transmission program 105 shown in the first and second embodiments may be recorded in a variety of computer-readable recording media, and may be produced and distributed. Such media include a magnetic disk such as a magnetic tape and a flexible disk, an optical recording medium such as a DVD-ROM, a DVD-RAM, a CD-ROM, a CD-R, an MO, and a PD, and a, recording medium such as a flash memory.

Also, the address book transmission program 105 may be transmitted via a network such as the Internet, broadcasting, electronic communication lines, satellite communication, or the like.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included, therein.

What is claimed is:

1. A non-transitory computer-readable recording medium having recorded therein an address book transmission program for causing a computer, which includes a storage that stores therein recipient setting address book data and one or more pieces of personal address book data, each piece of personal address book data corresponding to one or more senders, to transmit the pieces of personal address book data to a data transmission apparatus, the recipient setting address book data including one or more addresses for receiving data destined to each of one or more users, the pieces of personal address book data each including, with respect to each of a recipients' names, one of a receiving address and a reference instruction for referring to the recipient setting address book data of a recipient, the address book transmission program causing the computer to execute:

a receiving step of receiving, from the data transmission apparatus, apparatus information indicating a state of the data transmission apparatus;

a reading step of reading a piece of personal address book data that corresponds to one of the senders using the data transmission apparatus out of the pieces of personal address book data stored in the storage;

a judging step of, based on the apparatus information received in the receiving step, in a case where the piece of personal address book data read in the reading step includes at least one reference instruction with respect to at least one of the recipients' names, receiving the recipient setting address book data of the recipient stored in the storage, and judging, with use of the recipient setting address book data of the recipient, whether a use mode, which shows how the data transmission apparatus uses personal address book data, shows that the data transmission apparatus is able to specify a receiving address corresponding to the at least one recipient's name;

a first transmitting step that, when a result of the judging step is affirmative, transmits the read piece of personal address book data of the one sender to the data transmission apparatus;

an editing step of, when the result of the judging step is negative, specifying the receiving address corresponding to the at least one recipient name with use of the recipient setting address book data, and editing the read piece of personal address book data of the one sender to replace the reference instruction with the specified receiving address of the recipient; and a second transmitting step of transmitting the edited piece of personal address book data to the data transmission apparatus.

2. The non-transitory computer-readable recording medium of claim 1, wherein the read piece of personal address book data includes an item described in a prescribed language, the apparatus information indicates a determined language that has been determined for the data transmission apparatus, the judging step judges, based on the apparatus information, whether or not the use mode shows that the data transmission apparatus uses the prescribed language as the determined language, and the editing step edits the piece of personal address book data to convert the item described in the prescribed language into the item described in a common language.

3. The non-transitory computer-readable recording medium of claim 1, wherein the read piece of address book data includes image data in a prescribed data format, the judging step specifies, based on the apparatus information, as the use mode, one or more data formats according to which the data transmission apparatus is able to display the image data when displaying the piece of personal address book data, and judges whether or not the use mode shows that the data transmission apparatus is able to display image data in the prescribed data format, by judging whether or not the prescribed data format is included in the specified data formats, and the editing step edits the piece of personal address book data to convert the prescribed data format of the image data into one of the specified data formats.

4. The non-transitory computer-readable recording medium of claim 1, wherein the read piece of address book data includes image data having a prescribed resolution, the judging step specifies, based on the apparatus information, as the use mode, one or more resolutions according to which the data transmission apparatus is able to display the image data when displaying the piece of personal address book data, and judges whether or not the use mode shows that the data transmission apparatus is able to display image data having the prescribed resolution, by judging whether or not the prescribed resolution is included in the specified resolutions, and the editing step edits the piece of personal address book data to convert the prescribed resolution of the image data into one of the specified resolutions.

5. The non-transitory computer-readable recording medium of claim 1, wherein the read piece of personal address book data includes, with respect to each of the recipients' names, one of a piece of monochrome image data and a piece of color image data, when the piece of address book data includes at least one piece of color image data with respect to at least one of the recipients' names, the judging step further judges, based on the apparatus information, whether or not the use mode shows that the data transmission apparatus is able to display color image data, and the editing step edits the piece of personal address book data to convert the color image data into monochrome image data.

6. An address book transmission method for causing a computer, which includes a storage that stores therein recipient setting address book data and one or more pieces of personal address book data, each piece of personal address book data corresponding to one or more senders, to transmit the pieces of personal address book data to a data transmission apparatus, the recipient setting address book including one or more addresses for receiving data destined to each of one or more users, the pieces of personal address book data each including, with respect to each of a recipients' names, one of a receiving address and a reference instruction for referring to the recipient setting address book data of a recipient, the address book transmission method comprising:

a receiving step of receiving, from the data transmission apparatus, apparatus information indicating a state of the data transmission apparatus;

a reading step of reading a piece of personal address book data that corresponds to one of the senders using the data transmission apparatus out of the pieces of personal address book data stored in the storage;

a judging step of, based on the apparatus information received in the receiving step, in a case where the piece of personal address book data read in the reading step includes at least one reference instruction with respect to at least one of the recipients' names, receiving the recipient setting address book data of the recipient stored in the storage, and judging, with use of the recipient setting address book data of the recipient, whether a use mode, which shows how the data transmission apparatus uses personal address book data, shows that the data transmission apparatus is able to specify a receiving address corresponding to the at least one recipient's name;

a first transmitting step of, when a result of the judging step is affirmative, transmitting the read piece of address book data of the one sender to the data transmission apparatus;

an editing step of, when the result of the judging step is negative, specifying the receiving address corresponding to the at least one recipient name with use of the recipient setting address book data, and editing the read piece of personal address book data of the one sender to replace the reference instruction with the specified receiving address of the recipient; and a second transmitting step of transmitting the edited piece of personal address book data to the data transmission apparatus.

7. The address book transmission method of claim 6, wherein the read piece of personal address book data includes an item described in a prescribed language, the apparatus information indicates a determined language that has been determined for the data transmission apparatus, the judging step judges, based on the apparatus information, whether or not the use mode shows that the data transmission apparatus uses the prescribed language as the determined language, and the editing step edits the piece of personal address book data to convert the item described in the prescribed language into the item described in a common language.

8. The address book transmission method of claim 6, wherein the read piece of personal address book data includes image data in a prescribed data format, the judging step specifies, based on the apparatus information, as the use mode, one or more data formats according to which the data transmission apparatus is able to display the image data when displaying the piece of personal address book data, and judges whether or not the use mode shows that the data transmission apparatus is able to display image data in the prescribed data format, by judging whether or not the prescribed data format is included in the specified data formats, and the editing step edits the piece of personal address book data to convert the prescribed data format of the image data into one of the specified data formats.

9. The address book transmission method of claim 6, wherein the read piece of personal address book data includes image data having a prescribed resolution, the judging step specifies, based on the apparatus information, as the use mode, one or more resolutions according to which the data transmission apparatus is able to display the image data when displaying the piece of personal address book data, and judges whether or not the use mode shows that the data transmission apparatus is able to display image data having the prescribed resolution, by judging whether or not the prescribed resolution is included in the specified resolutions, and the editing step edits the piece of personal address book data to convert the prescribed resolution of the image data into one of the specified resolutions.

10. The address book transmission method of claim 6, wherein the read piece of personal address book data includes, with respect to each of the recipients' names, one of a piece of monochrome image data and a piece of color image data, when the piece of personal address book data includes at least one piece of color image data with respect to at least one of the recipients' names, the judging step judges, based on the apparatus information, whether or not the use mode shows that the data transmission apparatus is able to display color image data, and the editing step edits the piece of personal address book data to convert the color image data into monochrome image data.

11. An address server that transmits pieces of address book data to a data transmission apparatus, the address server comprising:

a storage that stores therein recipient setting address book data and one or more pieces of personal address book data, each piece of personal address book data corresponding to one or more senders, the recipient setting address book data including one or more addresses for receiving data destined to each of one or more users, the pieces of personal address book data each including, with respect to each of a recipients' names, one of a receiving address and a reference instruction for referring to the recipient setting address book data of a recipient;

a receiver operable to receive, from the data transmission apparatus, apparatus information indicating a state of the data transmission apparatus;

a reader operable to read a piece of personal address book data that corresponds to one of the senders using the data transmission apparatus out of the pieces of personal address book data stored in the storage;

a judge operable to, based on the apparatus information received by the receiver, in a case where the piece of personal address book data read by the reader includes at least one reference instruction with respect to at least one of the recipients' names, receive the recipient setting address book data of the recipient stored in the storage, and judge, with use of the recipient setting address book data of the recipient, whether a use mode, which shows how the data transmission apparatus uses personal address book data, shows that the data transmission apparatus is able to specify a receiving address corresponding to the at least one recipient name;

a first transmitter operable to, when a result of the judgment by the judge is affirmative, transmit the read piece of personal address book data of the one sender to the data transmission apparatus;

an editor operable to, when the result of the judgment by the judge is negative, specify the receiving address corresponding to the at least one recipient's name with use of the recipient setting address book data, and edit the read piece of personal address book data of the one sender to replace the reference instruction with the specified receiving addresses of the recipient; and a second transmitter operable to transmit the edited piece of personal address book data to the data transmission apparatus.

\* \* \* \* \*